United States Patent
Bolaski

(10) Patent No.: US 7,258,038 B1
(45) Date of Patent: *Aug. 21, 2007

(54) THROTTLE VALVE CABLE ASSEMBLY

(75) Inventor: Lawrence P. Bolaski, Rockingham, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/140,158

(22) Filed: May 27, 2005

Related U.S. Application Data

(62) Division of application No. 10/402,516, filed on Mar. 28, 2003, now Pat. No. 6,938,317.

(51) Int. Cl.
*F16C 1/22* (2006.01)

(52) U.S. Cl. .................................... 74/502.6

(58) Field of Classification Search ........... 74/501.5 R, 74/502.4, 502.6
See application file for complete search history.

(56) References Cited

U.S. PATENT DOCUMENTS

| | | | | |
|---|---|---|---|---|
| 3,890,772 A * | 6/1975 | Seifert et al. | ................ | 56/202 |
| 4,041,679 A * | 8/1977 | Seifert et al. | ................ | 56/11.3 |
| 4,175,450 A | 11/1979 | Bennett | ................ | 74/501 P |
| 4,841,806 A * | 6/1989 | Spease | ................ | 74/501.5 R |
| 4,847,943 A * | 7/1989 | Blase et al. | ................ | 15/352 |
| 4,869,123 A | 9/1989 | Stocker | ................ | 74/501.5 |
| 4,903,541 A * | 2/1990 | Shiota | ................ | 74/501.5 R |
| 5,046,380 A | 9/1991 | Matsumoto et al. | ................ | 74/502.4 |
| 5,174,170 A | 12/1992 | Kato et al. | ................ | 74/502.6 |
| 5,295,408 A | 3/1994 | Nagle et al. | ................ | 74/502.6 |
| 5,570,612 A * | 11/1996 | Reasoner | ................ | 74/502.6 |
| 5,575,180 A * | 11/1996 | Simon | ................ | 74/502.4 |
| 5,638,721 A | 6/1997 | Lee | ................ | 74/500.5 |
| 5,727,425 A | 3/1998 | Lee | ................ | 74/500.5 |
| 5,868,038 A * | 2/1999 | Bravo | ................ | 74/502.4 |
| 6,038,942 A * | 3/2000 | Gabas et al. | ................ | 74/500.5 |
| 7,093,514 B1 * | 8/2006 | Bolaski | ................ | 74/502.6 |

FOREIGN PATENT DOCUMENTS

GB 2258028 A 1/1993

* cited by examiner

*Primary Examiner*—Richard Ridley
*Assistant Examiner*—Matthew A. Johnson
(74) *Attorney, Agent, or Firm*—Clifford F. Rey

(57) ABSTRACT

The present invention is a replacement throttle valve cable assembly and method of use for an automatic transmission of a land vehicle, which permits repair of the throttle valve cable without unnecessary replacement of serviceable components such as the cable housing and linkage clip components. This is accomplished by the use of a cable stop device or so-called adjustment stud, which permits transmission shift performance to be fine-tuned by temporary adjustments to the cable length prior to permanent installation. The adjustment stud includes a temporary setscrew fastener integrally connected to a permanent swage fastener by an undercut shear zone. Once the cable length is established and the vehicle road tested, the swage fastener is permanently installed on the cable. Thereafter, the segmented portion of the adjustment stud containing the setscrew is snapped off at the shear zone along with any excess cable by a suitable tool.

4 Claims, 4 Drawing Sheets

THROTTLE VALVE CABLE ASSEMBLY

CROSS-REFERENCE TO RELATED APPLICATION

This application is a divisional application of U.S. patent application Ser. No. 10/402,516 filed Mar. 28, 2003 now U.S. Pat. No. 6,938,317, entitled Method of Repairing a Throttle Valve Cable Assembly, and claims the benefits thereof under 35 USC 121.

BACKGROUND OF THE INVENTION

The present invention relates to automatic transmissions and, more particularly, to a replacement throttle valve cable assembly for General Motors GM 4L60, GM3T40, GM4T60, THM 200, THM 325-4L, and THM 200-4R (hereinafter "GM transmissions").

Automotive vehicles with carbureted engines utilize a throttle valve cable, which attaches to the throttle valve linkage at one end thereof and is connected to a throttle valve control lever on the transmission housing. The throttle valve (hereinafter "TV") cable is routed from the throttle body in the engine compartment under tension passing through a cable housing and bends to conform to mounting brackets located on the engine and transmission to be secured on the throttle valve of the transmission.

The length of the TV cable is critical to proper shift performance. If the TV cable is shortened, both line pressure and shift points will be raised. Alternatively, if the TV cable is lengthened, both line pressure and shift points are lowered. Operating the vehicle with a longer TV cable causes premature clutch wear and other transmission malfunctions.

The TV cable is subject to mechanical wear and fraying and must eventually be replaced at periodic maintenance intervals. At present the original equipment manufacture for the GM transmissions provides the throttle valve cable only in a predetermined length in a complete assembly, which requires the replacement of otherwise serviceable components such as the cable housing and linkage clip along with the TV cable. This involves significant replacement costs for the vehicle owner when repair of the TV cable is necessary. Many vehicle owners would like to override the predetermined factory setting of the throttle valve cable, tailor the shift points or shift feel of the vehicle, and reduce related service and labor costs.

There are known prior art patents that are available in the field of throttle valve cables and cable fittings and their discussion follows. One example of a prior art throttle valve cable is disclosed in U.S. Pat. No. 5,638,721 to Lee and also in U.S. Pat. No. 5,727,425 to Lee, which teach a method and apparatus for adjusting a throttle valve cable in an automatic transmission. In these patents a sleeve and spring are installed at the distal end of the throttle valve cable between the cable end clamp and the tear-drop shaped cable end fitting on the throttle valve cable. The spring opposes movement of the cable end fitting toward the distal end of the throttle valve cable so that the cable end fitting is at its maximum distal position only at fully open throttle. This gives the vehicle operator the shift feel of a shorter throttle valve cable at most throttle openings. The sleeve and spring are installed only on throttle valve cables in automatic transmissions that do not have throttle valve cable end fittings permanently attached to a throttle cam.

An example of a throttle cable fitting structure is shown in U.S. Pat. No. 5,046,380 to Matsumoto et al. which discloses a throttle valve operating cam of an automatic transmission and an output control member of an automotive engine interconnected so as to cooperate with each other by a cable consisting of an outer tube and an inner cable.

Another example of a cable adjustment device for an automotive throttle body is shown in U.S. Pat. No. 5,295,408, to Nagle et al. which discloses an adjustable cable strand end fitting for use in adjusting the slack or tension in a cable strand attached through the fitting to a throttle body moveable member.

U.S. Pat. No. 5,174,170 to Kato et al. and U.S. Pat. No. 4,869,123 to Stocker disclose cable length adjustment and cable position control devices, which may be considered relevant to the present invention.

While these devices fulfill their respective, particular objectives and requirements, the aforementioned patents do not disclose the throttle valve cable assembly including the cable adjustment stud of the present invention, which substantially departs from the conventional concepts and designs of the prior art.

SUMMARY OF THE INVENTION

Accordingly, the present invention is a Throttle Valve (hereinafter "TV") Cable Assembly provided in kit form, which permits replacement and adjustment of the TV cable without unnecessary replacement of serviceable components such as the cable housing and linkage clip. The present TV Cable Assembly features a cable stop device, which allows transmission shift timing to be fine-tuned by making repeated adjustments to the cable length prior to permanent installation of the cable. This is accomplished by use of a so-called cable adjustment stud including a temporary setscrew fastener integrally connected with a permanent swage fastener by an undercut shear zone. Once the TV cable length is properly set, the swage fastener is crimped to the cable to complete the permanent installation. Thereafter, the segmented portion of the adjustment stud containing the setscrew fastener is loosened and snapped off at the shear zone along with any excess cable by a suitable tool such as pliers. The adjustable length of the present TV Cable Assembly provides a universal fit to many different GM transmissions.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
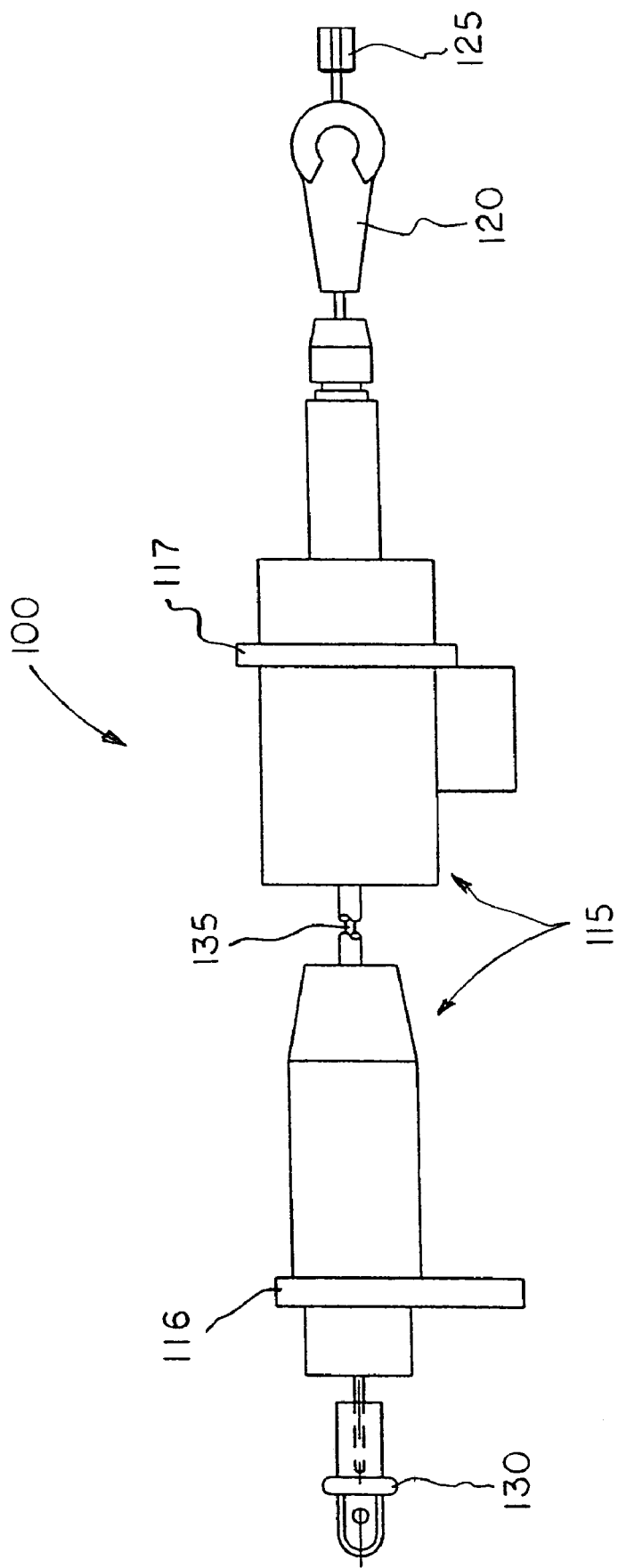
FIG. 1 is an elevational view of a Throttle Valve Cable Assembly being labeled Prior Art.

Prior to describing the TV Cable Assembly of the present invention, it may be beneficial to review a TV Cable Assembly of the prior art for purposes of comparison. With reference to FIG. 1 there is shown therein a TV Cable Assembly in accordance with the prior art, indicated generally at 100 and illustrated in FIG. 1. The TV Cable Assembly 100 is comprised of a two-part cable housing, indicated generally at 115, including mounting brackets 116, 117, a linkage clip 120, cable stop 125, cable connector 130, and cable 135.

The throttle valve cable 135 is disposed within the housing 115 in sliding engagement therewith and also extends through the linkage clip 120, which is permanently captured thereon by a swage block or swedge 125. On carbureted GM vehicles the cable 135 is attached at a first end thereof by the linkage clip 120 to the linkage rod (not shown), which opens the carburetor or throttle body. The opposite end of the cable 135 is coupled via the cable connector 130 to the throttle valve control lever 150 (FIG. 2) on the side of the transmission housing, which actuates the throttle valve, indicated generally at 200, within the transmission.

Figure 2:
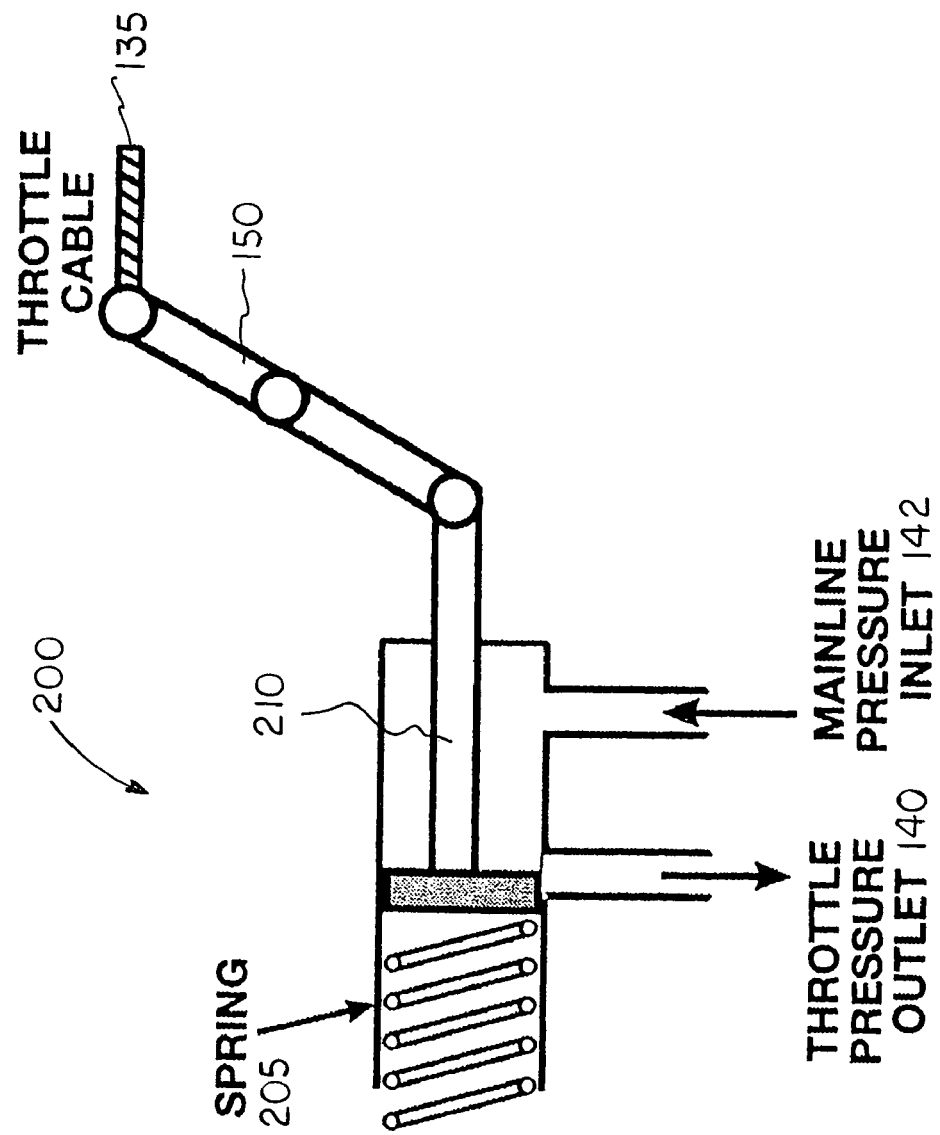
FIG. 2 is a diagrammatic view of the throttle valve of the GM transmissions being labeled Prior Art.

The throttle valve 200 (FIG. 2) monitors the engine throttle position and allows lower-speed shifts when the vehicle speed is relatively low compared with the engine throttle opening. The throttle valve 200 itself is a spool-type valve that uses a spring 205 and plunger 210 to oppose mainline hydraulic pressure acting through its inlet port as at 142. When the engine throttle is opened by pressing down on the accelerator pedal, the cable 135 via the linkage clip 120 pulls the throttle valve control lever 150 and compresses the spring 205, applying pressure to the throttle valve in the transmission. As shown in FIG. 2 this causes the throttle valve 200 to open the throttle pressure outlet port as at 140, which releases hydraulic pressure to fluid circuits within the transmission. Fluid pressure from the throttle valve 200 is routed to the opposite side of the shift valve to balance governor pressure against throttle position, which allows shifting to occur at the correct time.

The length of the TV cable is critical to proper shift performance. If the TV cable is shortened, both line pressure and shift points will be raised. Alternatively, if the TV cable is lengthened, both line pressure and shift points are lowered. The road speeds at which each shift occurs can be fine-tuned by adjustments to the length of the TV cable in the GM transmissions. The present invention has been developed to facilitate such adjustment and to resolve other shortcomings of the prior art.

Figure 3:
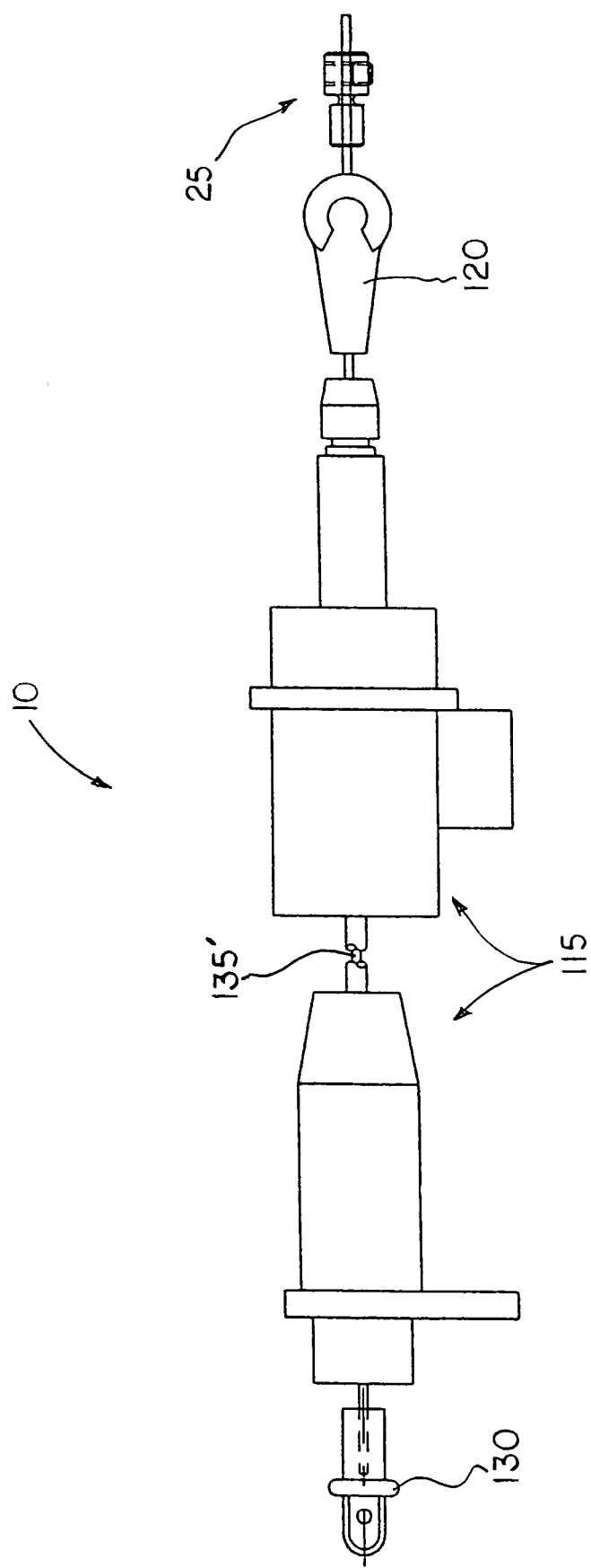
FIG. 3 is an elevational view of the Throttle Valve Cable Assembly of the present invention.

Referring to FIG. 3 there is shown therein a TV Cable Assembly in accordance with the present invention, indicated generally at 10. It will be understood that in accordance with the present invention, the original equipment manufacture (hereinafter "OEM") cable housing 115 with brackets 116, 117 and the linkage link 120 may be reused if serviceable and that only the universal cable 135' including a new cable connector 130 and the adjustment stud, indicated generally at 25, are replaced when using the present invention.

In practical use of the present invention, the new universal cable 135' including a cable connector 130 preinstalled at a first end thereof is fabricated to a predetermined length that is sufficient to accommodate each of the aforementioned GM transmissions. In accordance with the present invention, a new cable adjustment stud 25 is installed at the opposite end of the cable 135' to complete the installation as explained hereinafter in further detail.

Figure 4:
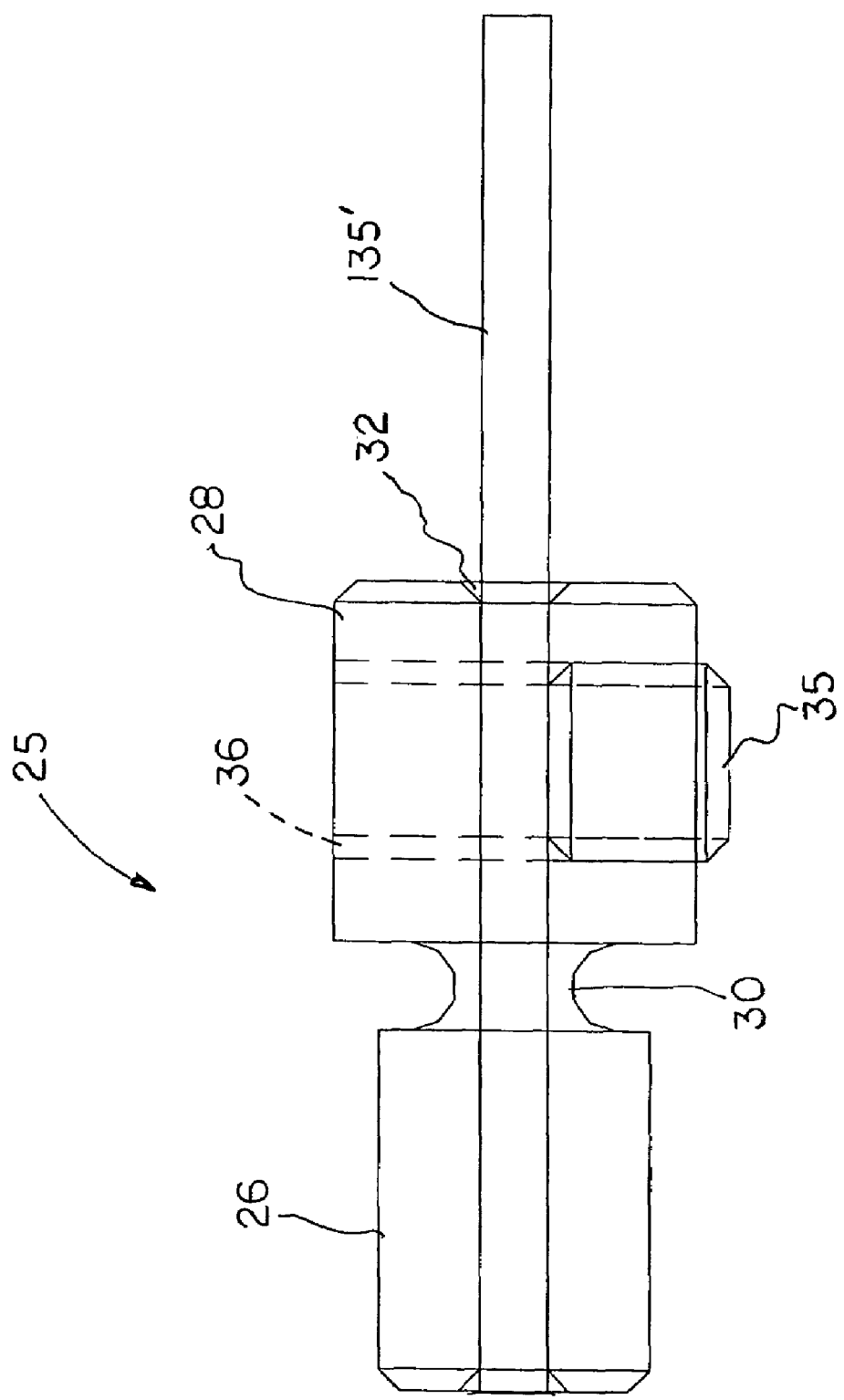
FIG. 4 is an elevational view of the adjustment stud of the present invention installed on the TV cable.

As shown in FIG. 4 the adjustment stud 25 is a segmented construction, which effectively comprises two separate fastening devices. More particularly, the adjustment stud 25 includes a swage fastener 26 and a setscrew fastener 28 integrally connected by an undercut shear zone as at 30. The shear zone 30 is designed to allow physical separation of swage fastener 26 and setscrew fastener 28 by a manual tool such as pliers after installation is complete.

In the preferred embodiment the adjustment stud 25 is fabricated from a malleable metal such as copper C11000 per American Society of Testing and Materials (ASTM) B187-97 or other suitable material in the configuration shown in FIG. 4.

The adjustment stud 25 provides structures comprising cable length adjusting means including, but not limited to, the following structures. The adjustment stud 25 includes a through bore 32 wherein the replacement cable 135' resides after assembly. At least one setscrew 35 positioned within the setscrew fastener 28 portion engages mating threads 36 extending into the bore 32. A second setscrew 35 (not illustrated) may be advanced into threads 36 from the opposite side of the fastener 28 if desired.

It will be appreciated that at least one setscrew 35 is advanced into the threads 36 to clamp the stud 25 in position on the cable 135' as shown in FIG. 4 to temporarily adjust the length of TV cable 135' prior to road testing. Utilizing this method the time at which transmission shifting occurs relative to engine revolutions per minute (rpm) can be fine-tuned, which often requires several adjustments of the TV cable length and repeated road tests.

Once the appropriate length of TV cable 135' is established, the swage fastener 26 is permanently installed by crimping it to cable 135' with a swaging tool (not shown). Swage fastener 26 is crimped or swaged onto cable 135' with a minimum of 25 foot pounds using a swaging tool, which permanently fuses the fastener 26 to the cable 135'. Since such swaging tools are well known in the art, further detailed discussion thereof is not deemed necessary.

Thereafter, the setscrew 35 is loosened and the setscrew fastener 28 is snapped off at the shear zone 30 by a suitable tool such as pliers and removed from the TV cable 135'. Any excess TV cable 135' is also trimmed off and discarded.

Thus, it can be seen that the present TV Cable Assembly 10 provides a replacement TV cable 135' that permits the reuse of serviceable components such as the two-part OEM cable housing 115 and linkage clip 120 components, which substantially reduces part replacement/labor costs to the consumer.

The present TV Cable Assembly also provides a universal fit to several different GM transmissions, which resolves the problem of ordering a prefabricated TV Cable Assembly designed for a specific transmission. In addition, the adjustment stud 25 of the present invention allows shift timing to be fine-tuned by repeated adjustments to the length of the replacement cable 135' prior to permanent installation without damage to the TV cable.

Although not specifically illustrated in the drawings, it should be understood that additional equipment and structural components will be provided as necessary and that all of the components described above are arranged and supported in an appropriate fashion to form a complete and operative Throttle Valve Cable Assembly and Method of Use incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A throttle valve cable assembly for an automatic transmission of a land vehicle, said throttle valve cable assembly comprising:
   a throttle valve cable housing having an axial bore;
   a linkage clip having an axial bore;
   a throttle valve cable for insertion within the axial bores in said housing and said linkage clip;
   a cable connector for attachment to a first end of said throttle valve cable; and
   cable length adjusting means for attachment to an opposite end of said throttle valve cable for permitting temporary length adjustments to said throttle valve cable to adjust transmission shift performance prior to permanent installation of said throttle valve cable assembly within the vehicle;
   wherein said cable length adjusting means includes a cable adjustment stud having an axial bore, wherein said cable adjustment stud further comprises a swage fastener and a setscrew fastener integrally connected by an undercut shear zone to permit separation of said setscrew fastener from said swage fastener after permanent installation thereof.

2. The throttle valve cable assembly of claim 1 wherein said setscrew fastener includes at least one setscrew for mating engagement with threads formed therein, said threads extending into said axial bore to permit temporary attachment of said cable adjustment stud to said cable by advancement of said at least one setscrew via said threads into contact with said cable.

3. The throttle valve cable assembly of claim 1 wherein said cable adjustment stud is fabricated from a malleable metal.

4. The throttle valve cable assembly of claim 1 wherein said cable adjustment stud is fabricated from copper.

* * * * *